(12) United States Patent
Logunov

(10) Patent No.: US 11,726,273 B2
(45) Date of Patent: Aug. 15, 2023

(54) LIGHT DIFFUSING MULTI-FIBER DESIGN CONFIGURED FOR USE WITH UV LEDS

(71) Applicant: CORNING INCORPORATED, Corning, NY (US)

(72) Inventor: Stephan Lvovich Logunov, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 17/312,446

(22) PCT Filed: Dec. 6, 2019

(86) PCT No.: PCT/US2019/064865
§ 371 (c)(1),
(2) Date: Jun. 10, 2021

(87) PCT Pub. No.: WO2020/131420
PCT Pub. Date: Jun. 25, 2020

(65) Prior Publication Data
US 2022/0050252 A1     Feb. 17, 2022

Related U.S. Application Data

(60) Provisional application No. 62/783,751, filed on Dec. 21, 2018.

(51) Int. Cl.
*G02B 6/42*     (2006.01)
*F21K 9/69*     (2016.01)
*F21Y 115/10*     (2016.01)

(52) U.S. Cl.
CPC .............. *G02B 6/4203* (2013.01); *F21K 9/69* (2016.08); *G02B 6/4206* (2013.01); *F21V 2200/10* (2015.01); *F21Y 2115/10* (2016.08)

(58) Field of Classification Search
CPC ....... G02B 6/4203; G02B 6/4206; F21K 9/69; F21V 2200/10; F21Y 2115/10
See application file for complete search history.

(56) References Cited

U.S. PATENT DOCUMENTS

| 5,315,685 A | 5/1994 | Fabian et al. |
| 6,204,304 B1 | 3/2001 | Houlihan et al. |

(Continued)

FOREIGN PATENT DOCUMENTS

| CN | 104010710 A | 8/2014 |
| CN | 204840698 U | 12/2015 |

(Continued)

OTHER PUBLICATIONS

Tandon et al., "Nano-Engineered Optical Fibers and Applications", Nanophotonics, vol. 2, No. 5-6, 2013, pp. 383-392.

(Continued)

*Primary Examiner* — Mary Ellen Bowman
(74) *Attorney, Agent, or Firm* — Svetlana Z. Short

(57) ABSTRACT

Disclosed herein are embodiments of an ultraviolet (UV) illumination system. The UV illumination system includes at least one UV light emitting diode (LED) and a light-diffusing optical fiber bundle. The light-diffusing optical fiber bundle includes a bundle jacket and a plurality of optical fibers disposed within the bundle jacket. Each optical fiber is made up of a glass core having a glass composition with less than 90 mol % silica and a cladding surrounding the glass core. At least one of the glass core or the cladding includes scattering centers. Further, the light-diffusing optical fiber bundle is optically coupled to the UV LED. Also disclosed herein are a UV light-diffusing fiber and a method of sterilizing an object using a UV illumination system contain a UV light-diffusing fiber.

48 Claims, 2 Drawing Sheets

(56) References Cited

U.S. PATENT DOCUMENTS

| | | |
|---|---|---|
| 6,468,428 B1 | 10/2002 | Nishii et al. |
| 6,551,346 B2 | 4/2003 | Crossley |
| 6,764,655 B1 | 7/2004 | Nishii et al. |
| 7,450,806 B2 | 11/2008 | Bookbinder et al. |
| 8,404,273 B2 | 3/2013 | Baumgart et al. |
| 8,545,076 B2 | 10/2013 | Bickham et al. |
| 8,585,681 B2 | 11/2013 | Boenig et al. |
| 8,591,087 B2 | 11/2013 | Bickham et al. |
| 8,620,125 B2 | 12/2013 | Button et al. |
| 8,779,386 B2 | 7/2014 | Bak |
| 8,805,141 B2 | 8/2014 | Fewkes et al. |
| 8,980,174 B2 | 3/2015 | Deutsch et al. |
| 9,039,966 B2 | 5/2015 | Anderson et al. |
| 9,067,059 B2 | 6/2015 | Bissig et al. |
| 9,207,397 B2 | 12/2015 | Bennett et al. |
| 9,259,513 B2 | 2/2016 | Bedwell et al. |
| 9,393,339 B2 | 7/2016 | Yeo et al. |
| RE46,098 E | 8/2016 | Bickham et al. |
| 9,439,989 B2 | 9/2016 | Peterson et al. |
| 9,550,005 B2 | 1/2017 | Lin et al. |
| 9,795,466 B2 | 10/2017 | Loupis et al. |
| 9,808,647 B2 | 11/2017 | Rhodes et al. |
| 9,925,390 B2 | 3/2018 | Yehezkel |
| 9,943,379 B2 | 4/2018 | Gregg et al. |
| 10,046,070 B1 | 8/2018 | Lopez et al. |
| 10,166,402 B2 | 1/2019 | Brennan et al. |
| 10,183,144 B2 | 1/2019 | Tang et al. |
| 10,241,035 B2 | 3/2019 | Bonnick et al. |
| 2005/0074216 A1 | 4/2005 | Irie |
| 2005/0131955 A1* | 6/2005 | Borthakur ............ G06F 16/148 |
| 2006/0085052 A1 | 4/2006 | Feuerstein et al. |
| 2009/0257910 A1 | 10/2009 | Segal |
| 2010/0268151 A1 | 10/2010 | Mauge et al. |
| 2013/0035629 A1 | 2/2013 | Soltz et al. |
| 2014/0355295 A1 | 12/2014 | Kuchinisky et al. |
| 2015/0080709 A1 | 3/2015 | Chaturvedi |
| 2015/0131955 A1* | 5/2015 | Bennett ............ G02B 6/03633 385/123 |
| 2016/0116660 A1 | 4/2016 | Benjamin et al. |
| 2018/0036443 A1 | 2/2018 | Messerly |
| 2018/0147417 A1 | 5/2018 | Rantala |
| 2018/0178031 A1 | 6/2018 | Wu |
| 2018/0207302 A1 | 7/2018 | Vasilenko |
| 2018/0304094 A1 | 10/2018 | Hicks et al. |
| 2018/0326104 A1 | 11/2018 | Hawkins et al. |
| 2021/0122667 A1* | 4/2021 | Westerhoff ............ C03C 25/105 |

FOREIGN PATENT DOCUMENTS

| | | | |
|---|---|---|---|
| CN | 105396169 A | 3/2016 | |
| CN | 106178280 A | 12/2016 | |
| CN | 106178282 A | 12/2016 | |
| CN | 108671243 A | 10/2018 | |
| DE | 102009044926 A1 * | 3/2011 | ............ B01J 21/063 |
| DE | 102009044926 A1 | 3/2011 | |
| EP | 2854944 A1 | 4/2015 | |
| JP | 01-219707 A | 9/1989 | |
| JP | 5546575 B2 | 7/2014 | |
| KR | 10-1362704 B1 | 2/2014 | |
| KR | 10-1851576 B1 | 4/2018 | |
| KR | 10-2018-0049757 A | 5/2018 | |
| KR | 10-1892996 B1 | 8/2018 | |
| KR | 10-2018-0135256 A | 12/2018 | |
| KR | 10-2018-0135257 A | 12/2018 | |
| SG | 11201603590 Y | 12/2014 | |
| SG | 11201407227 R | 10/2017 | |
| WO | 2013/177674 A1 | 12/2013 | |
| WO | 2015/168129 A1 | 11/2015 | |
| WO | 2018/009864 A1 | 1/2018 | |
| WO | 2019/025808 A1 | 2/2019 | |
| WO | 2019/027478 A1 | 2/2019 | |

OTHER PUBLICATIONS

Whitehurst et al., Ultraviolet Pulse Transmission in Optical Fibres, Journal of Modern Optics, vol. 35, No. 3, 1988, pp. 371-385.
International Search Report and Written Opinion of the International Searching Authority; PCT/US2019/064865; dated Feb. 28, 2020; 8 pages; European Patent Office.

* cited by examiner

LIGHT DIFFUSING MULTI-FIBER DESIGN CONFIGURED FOR USE WITH UV LEDS

CROSS-REFERENCE TO RELATED APPLICATIONS

This application is a national stage application under 35 U.S.C. § 371 of International Application No. PCT/US2019/064865 filed on Dec. 6, 2019, which claims the benefit of priority under 35 U.S.C. § 119 of U.S. Provisional Application Ser. No. 62/783,751 filed on Dec. 21, 2018 the content of which is relied upon and incorporated herein by reference in its entirety.

BACKGROUND

The present invention generally relates to light-diffusing optical fibers and more particularly to light-diffusing optical fibers or bundles of fibers configured for use with ultraviolet light emitting diodes.

Light diffusing optical fibers (LDF) are configured to scatter light relatively uniformly over a length. The light scattered from the LDF can be used for a variety of purposes, including illumination or decoration. Generally, these LDF are selected from the visible spectrum. However, LDF are able to carry light from outside the visible spectrum, including the ultraviolet and infrared spectrum. LDF carrying these wavelengths also provide certain types of functionality.

SUMMARY

One embodiment of the disclosure relates to an ultraviolet (UV) illumination system. The UV illumination system includes at least one UV light emitting diode (LED) and a light-diffusing optical fiber bundle. The light-diffusing optical fiber bundle includes a bundle jacket and a plurality of optical fibers disposed within the bundle jacket. Each optical fiber is made up of a glass core having a glass composition with less than 90 mol % silica and a cladding surrounding the glass core. At least one of the glass core or the cladding includes scattering centers. Further, the light-diffusing optical fiber bundle is optically coupled to the UV LED.

Another embodiment of the disclosure relates to an aultraviolet (UV) light-diffusing fiber (LDF). The UV LDF includes a glass core having a glass composition of less than 90 mol % of SiO2. The UV LDF also includes a cladding disposed longitudinally around the glass core. At least one of the glass core or the cladding includes scattering centers. Further, the glass composition absorbs at least 10% of light having a wavelength less than 400 nm per meter.

Another embodiment of the disclosure relates to a method for sterilizing an object using ultraviolet (UV) light. In the method, UV light is caused to emit from at least one UV light emitting diode (LED) into an optical fiber bundle that is coupled to the UV LED. The optical fiber bundle includes a plurality of optical fibers disposed within a jacket, and each of the plurality of optical fibers has a glass core comprising less than 90 mol % silica. The UV light from the optical fiber bundle is scattered, and the object is exposed to the UV light scattered from the optical fiber bundle.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Referring generally to the figures, embodiments of a light-diffusing fiber (LDF) are provided that is configured for use with ultraviolet (UV) light emitting diodes (LEDs). UV LEDs are less expensive than other UV light sources, such as laser diodes. However, UV LEDs are also bigger than other UV light sources, which means that a larger LDF is needed to pair with a UV LED. Using a larger LDF typically involves bundling multiple silica fibers, and providing high-purity silica for the fibers in the LDF is also expensive. Thus, according to the present disclosure, embodiments of an LDF are provided that incorporate low-silica glass fibers. Ordinarily, low-silica glass is not used for UV applications because the UV absorption of such glass is known to increase as the weight percent (wt %) of silica decreases. However, when used over short lengths with a UV LED, the LDF is still able to diffuse enough UV light for sterilization applications, e.g., sterilization of medical instruments. In such applications, the high absorption at UV-wavelengths is acceptable because enough UV is diffused from the LDF over a short length, e.g., 2 m or less, to kill common bacterial pathogens. These and other embodiments will be described in more detail below.

Figure 1:
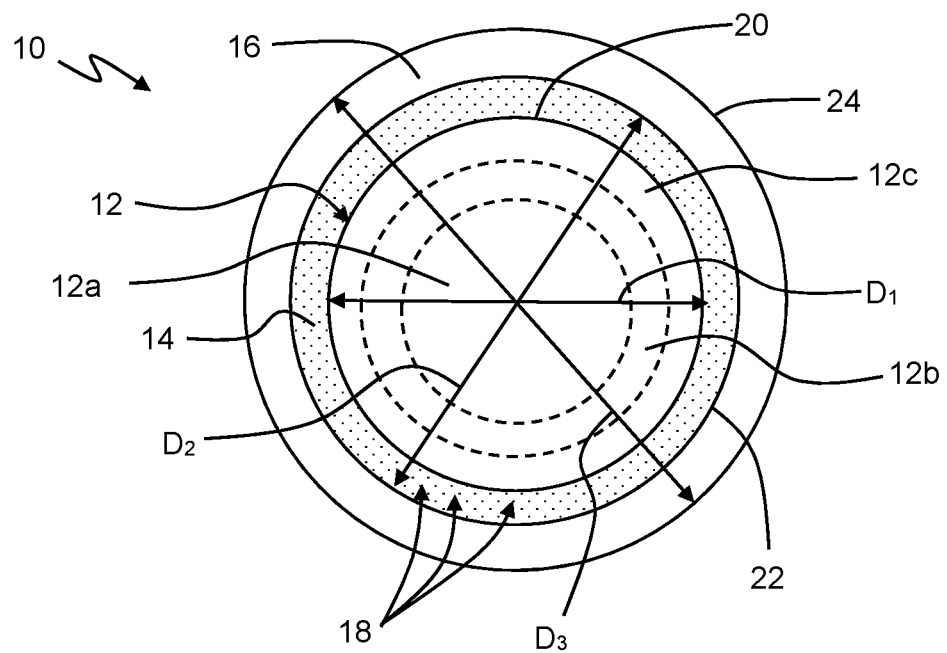
FIG. 1 is a cross-section view of a light diffusing optical fiber, according to exemplary embodiments.

FIG. 1 depicts the cross-section of a light-diffusing optical fiber (LDF) 10 having a circular cross section. The LDF 10 includes a core 12, a cladding 14, and a coating 16. Disposed within at least one of the core 12, the cladding 14, or the coating 16 are scattering centers 18 that facilitate the uniform diffusion of light from the LDF 10. In the embodiment depicted, the scattering centers 18 are contained in the cladding 16. The cladding 14 is disposed on an outer core surface 20 of the core 12, and the coating 16 is disposed on an outer cladding surface 22 of the cladding 14. In embodiments, an outer coating surface 24 defines the outermost extent (e.g., the radially outermost surface) of the LDF 10. In operation, light supplied from a UV LED light source enters the core 12 and is guided through the LDF 10. The direction of propagation of the guided light in the LDF 10 may be referred to herein as the longitudinal or axial direction. The scattering centers 18 effect scattering of light propagating in the LDF 10. Additionally, the difference in refractive indices between the core 12 and the cladding 14

(with the cladding 14 having a lower refractive index than the core 12) contributes additionally to scattering of the light propagating in the LDF 10. Rayleigh scattering in the core 12 and portion of the cladding 14 also contributes to scattering loss.

The difference in refractive indices between the core 12 and cladding 14 allows the core to act as a waveguide and causes Rayleigh scattering in the core and scattering at the core/cladding interface. For an LDF 10, the refractive indices can be considered in terms of the numerical aperture (NA), which is equal to $\sqrt{(n_{core}^2 - n_{clad}^2)}$, with $m_{core} > n_{clad}$. In embodiments, NA is from 0.12 to 0.7.

In embodiments, the core 12 is glass, such as silica glass or modified silica glass. the glass composition of the core region 10 is characterized as a soda-lime silicate glass, alkali borosilicate glass or an aluminosilicate glass. The soda-lime silicate glass can comprise varying levels of $Na_2O$, $CaO$ and $SiO_2$. For example, a suitable soda-lime silicate glass composition is 72 wt % $SiO_2$, 17 wt % $Na_2O$, 4 wt % $CaO$, 5 wt % $LiO_2$, and 2 wt % $MgO$. The alkali borosilicate glass can comprise varying levels of $SiO_2$, $B_2O_3$ and an alkali, e.g., $Na_2O$. For example, a suitable alkali borosilicate glass composition is 75 wt % $SiO_2$, 10 wt % $B_2O_3$, and 25 wt % $Na_2O$. The aluminosilicate glass can comprise varying levels of $SiO_2$ and $Al_2O_3$. An alkali, e.g., $Na_2O$, may also be included in the aluminosilicate glass composition. For example, suitable aluminosilicate glass compositions include 50.0 wt % to 75.0 wt % $SiO$, 0.0 wt % to 20.0 wt % $B_2O_3$, 0.0 wt % to 15.0 wt % $Al_2O_3$, 0.0 wt % to 1.5 wt % $Li_2O$, and 3.0 wt % to 11.0 wt % $Na_2O$. In still another embodiment, the glass composition includes from about 50 mol % to about 90 mol % $SiO_2$, up to 20 mol % of $Al_2O_3$, up to 20 mol % $B_2O_3$, and up to 25 mol % of at least one of $R_2O$ or $RO$. In $R_2O$, is any one or more of Li, Na, K, Rb, or Cs, and in RO, R is any one or more of Zn, Mg, Ca, Sr, or Ba. Further, in embodiments, certain impurities are kept at relatively low levels. In particular, Co, Ni, and Cr are each present at no more than 1 ppm, and Fe is present at no more than 50 ppm. In embodiments, the glass composition transmits approximately 85% of UV light at 405 nm and approximately 70% at 375 nm. An example of a suitable glass composition for use in embodiments of the present invention is Corning Iris™ (available from Corning Incorporated, Corning, N.Y.).

As mentioned above, the glass composition of the core 12 is lower in $SiO_2$ than other glass compositions that typically used for UV applications. The lower $SiO_2$ decreases the cost of the LDF 10. However, the lower $SiO_2$ level means that more UV light will be absorbed in the core 12 of the LDF 10. Accordingly, using a glass composition containing less than 90 mol % $SiO_2$ in UV applications is counterintuitive. Indeed, the glass compositions used in the core region 12 of the LDF 10 absorb at least 10% per meter of UV light that is incident on an end of the LDF 10. In other embodiments, the glass composition absorbs at least 30% of incident UV light per meter, and in still other embodiments, the glass composition absorbs at least 50% of incident UV light per meter. In certain embodiments, the glass composition absorbs up to 60% of incident UV light per meter. As will be discussed below, the high absorption losses are acceptable for certain applications because bundling of the LDFs 10 produces a sufficient total amount of scattering, especially over a short length.

In embodiments, the cladding 14 may be glass or a polymer. Glasses for the cladding 14 include the same low-silica glass as the core 12 or a modified silica glass. Polymers for the cladding 14 include acrylate polymers and/or fluorine-modified polymers.

In embodiments, the coating 16 is a polymer, such as an acrylate polymer. In selecting the materials for the core 12 and the cladding 14, the core 12 is selected to have a higher refractive index than the cladding 14. Further, in selecting the material for the coating 16, the material is selected to have a higher refractive index than the cladding 14.

The scattering centers 18 are selected based on the characteristic of low UV absorption between the wavelengths of 360 nm and 420 nm. In particular, high UV absorption materials, such as $TiO_2$, are not used as the scattering centers 18 in the LDF 10. Exemplary materials that may be used as the scattering centers 18 include $ZrO_2$, BaS, $Al_2O_3$, hollow glass spheres, glass phase separations, gas bubbles (e.g., $SO_2$ bubbles), and airlines. The core 12, the cladding 14, and/or the coating 16 may include more than one type of scattering center 18.

In embodiments, the scattering centers 18 in the cladding 14 are selected to have a higher refractive index than the refractive index of the cladding 14. In embodiments, the refractive index of the scattering centers 18 is at least 0.05 higher than the refractive index of the cladding 14. In further embodiments, the refractive index of the scattering centers 18 is at least 0.1 higher than the refractive index of the cladding 14. In still further embodiments, the refractive index of the scattering centers 18 is at least 0.2 higher than the refractive index of the cladding 14, and in even further embodiments, the refractive index of the scattering centers 18 is at least 0.5 higher than the refractive index of the cladding 14.

The scattering centers 18 may have a cross-section with a dimension of at least 30 nm, or at least 50 nm, or at least 100 nm, or at least 250 nm, or at least 500 nm, or at least 1000 nm, or between 30 nm and 40 µm (40,000 nm), or between 100 nm and 40 µm, or between 250 nm and 40 µm, between 500 nm and 20 µm, or between 1000 nm and 10 µm, or between 30 nm and 2000 nm. The scattering centers 18 within the core 12, the cladding 14, and/or the coating 16 may include a distribution of cross-sectional dimensions.

In the core 12, the scattering centers 18 (when present) may occupy a fill fraction of from 0.01% to 5% of the core 12. Further, in embodiments, the core 12 may be divided into multiple regions, e.g., central region 12a, intermediate region 12b, and outer region 12c. In embodiments, the scattering centers 18 may be contained in only one, only two, or all three regions 12a, 12b, 12c. In the cladding 14, the scattering centers 18 (when present) may occupy a fill fraction of from 0.05% to 2% of the cladding 14. In the coating 16, the scattering centers 18 (when present) may occupy a fill fraction of between 0.5% and 30%, or between 1% and 15%, or between 2% and 10% of the coating 16. As used herein, fill fraction refers to the fraction of the cross-sectional area occupied by the scattering centers. In one embodiment, the fill fraction is constant along the length of the light-diffusing element. In another embodiment, the fill fraction varies along the length of the light-diffusing element. To a good approximation, the fill fraction corresponds to the volume fraction of scattering centers 18. Thus, the volume fraction of scattering centers 18 within the core 12 may be from 0.01% to 5%. The volume fraction of scattering centers 18 within the cladding 14 may be from 0.05% to 2%. The volume fraction of scattering centers 18 within the coating 16 may be at least 0.5%, or at least 1.0%, or at least 2.0%, or at least 5.0%, or between 0.5% and 30%, or between 1.0% and 15%, or between 2.0% and 10%, or between 2.0% and 30%, or between 3.0% and 20%.

The cross-sectional distribution of scattering centers 18 may vary at different positions in the core 12, the cladding 14 and/or the coating 16 along the length of the LDF 10. The variations may also occur in the axial or length direction of the LDF 10.

The LDF 10 may be configured to scatter light along all or some of its length by controlling the placement and concentration of the scattering centers 18 in the cladding 14 and/or coating 16. Regions of the LDF 10 that include scattering centers 18 may efficiently scatter light to produce an illumination effect, while regions of the LDF 10 that lack scattering centers 18 may not.

The outer core surface 20 of core 12 defines a first cross-sectional dimension $D_1$. In embodiments, on average over the length of LDF 10, the first cross-sectional dimension $D_1$ of the core 12 may be at least 65 µm, or at least 80 µm, or at least 100 µm, or at least 150 µm, or at least 170 µm, or at least 200 µm, or at least 250 µm, or at least 300 µm, or between 65 µm and 500 µm, or between 100 µm and 400 µm, or between 200 µm and 350 µm, or any subranges therebetween.

The outer cladding surface 22 of cladding 14 defines a second cross-sectional dimension $D_2$. In embodiments, the second cross-sectional dimension $D_2$ is from 5 µm to 20 µm greater than the first cross-sectional dimension $D_1$ regardless of the size of the first cross-sectional dimension $D_1$. Thus, in embodiments, the thickness of cladding 14, i.e., the average distance between the outer core surface 20 and the outer cladding surface 22 along the length of the LDF 10, may be at least 5 µm, or at least 10 µm, or at least 20 µm, at least 30 µm, at least 40 µm, at least 50 µm, at least 60 µm, at least 70 µm, at least 80 µm, at least 90 µm, or up to 100 µm.

In embodiments, the outer coating surface 24 of the coating 16 defines a third cross-sectional dimension $D_3$. In embodiments, the third cross-sectional dimension $D_2$ is from 20 µm to 50 µm greater than the second cross-sectional dimension $D_2$. Thus, in embodiments, the coating 16 surrounding the cladding 14 has a thickness, i.e., the average distance between the outer cladding surface 22 and outer coating surface 24 along the length of the LDF 10, of at least 20 µm, at least 30 µm, at least 40 µm, or at least 50 µm, or between 20 µm and 50 µm, or between 20 µm and 40 µm, or between 20 µm and 30 µm, or between 40 µm and 50 µm, or between 30 µm and 50 µm. In embodiments, the outer coating surface 24 defines an outermost radial extent of the LDF 10 of about 230 µm, about 300 µm, about 400 µm, about 500 µm or about 550 µm.

While the LDF 10 has been described as having a circular cross-section, it is to be understood, however, that the cross-section of the LDF 10 may be arbitrarily shaped and may include round or flat sides. Shapes of the cross-section may include circle, oval, square, rectangle, and polygon as well as shapes that include a combination of round and flat sides. Thus, as used herein, cross-sectional dimension refers to the longest straight-line distance that connects two points of the outline (e.g. circumference, perimeter) of the cross-section. By way of example: for circular cross-sections, the cross-sectional dimension is the diameter; for elliptical cross-sections, the cross-sectional dimension is the length of the major axis; and for square or rectangular cross-sections, the cross-sectional dimension is the distance between opposite corners. It is further understood that the shape and/or dimensions of the cross-section may be constant or variable along the length dimension of the light-diffusing element. An LDF having a circular cross-section, for example, may be tapered, where the diameter of the circular cross-section varies along the length of the LDF.

With respect to the length dimension of the LDF 10, the disclosure primarily relates to short LDF 10 because of the high absorption of the low-silica glass in the core 12. Thus, in embodiments, the length of the LDF 10 is from 0.01 m to 2 m in length, 0.1 m to 2 m in length, 0.3 m to 2 m in length, 0.5 m to 2 m in length, 0.7 m to 2 m in length, 0.9 m to 2 m in length, 1.1 m to 2 m in length, 1.3 m to 2 m in length, 1.5 m to 2 m in length, or 1.7 m to 2 m in length, and any and all subranges between any of the foregoing ranges.

Figure 2:
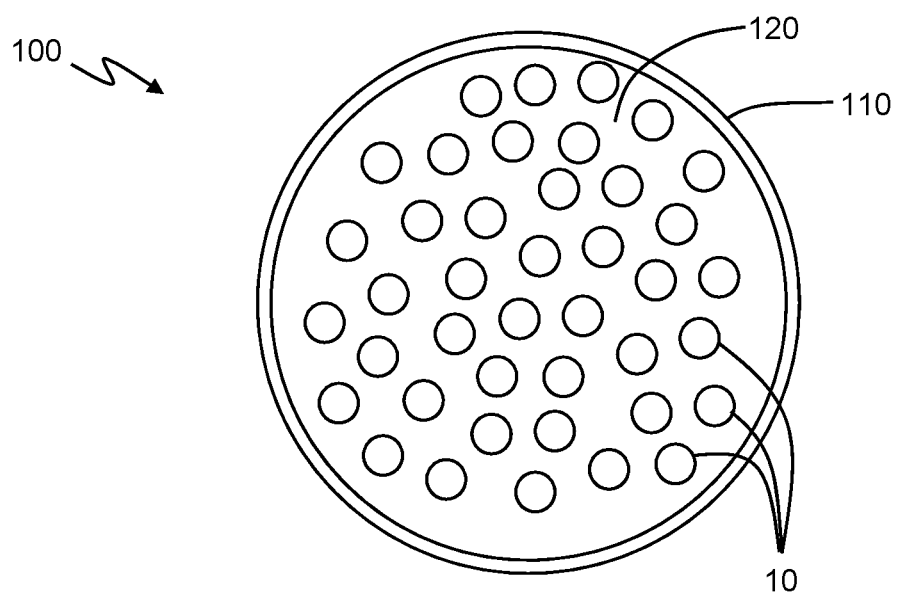
FIG. 2 is a cross-sectional view of a first exemplary embodiment of a light diffusing optical fiber bundle, according to an exemplary embodiment.

As mentioned briefly above, a single LDF 10 may not match the size of the UV LED, and therefore, multiple LDF 10 may be arranged in an LDF bundle 100. Referring to FIG. 2, one embodiment of an LDF bundle 100 is depicted. LDF bundle 100 includes a plurality of LDF 10 arranged within a jacket 110. Each LDF 10 is substantially the same as described above with respect to FIG. 1. Also disposed within the jacket 110 is a filler material 120, which is selected to be substantially transparent to UV light having a wavelength of from 360 nm to 420 nm. The operation of the LDF bundle 100 is substantially consistent with the operation of a single LDF 10. That is, incident light from a UV LED is directed into one of the ends of the LDF bundle 100, and thereby into one of the ends of each LDF 10 contained in the LDF bundle 100. Incident light travels within each LDF 10 and out through the core region 12, cladding 14, and coating 16 as scattering UV light rays. The scattered light rays then continue into the substantially transparent filler 120 and out of the LDF bundle 100 through the jacket 110.

The distribution and concentration of LDF 10 within each LDF bundle 100 can be selected for particular lighting applications in view of various considerations, including the dimensional requirements of the application, the amount of light needed for the application as a function of the length of the bundle 100, etc. It is also possible to utilize multiple configurations of LDF 10 (e.g., a combination of LDF 10 with varying configurations of scattering centers 18) within a given LDF bundle 100 for particular applications. In embodiments, the LDF bundle 100 includes from 4 to 10,000 LDF 10. For example, for a UV LED light source having an area of 3 mm$^2$, the LDF bundle 100 includes about 100 LDF 10 with each LDF 10 having a third cross-sectional dimension $D_3$ of 170 µm. The number of LDF 10 in an LDF bundle 100 depends on the diameter of the LDF bundle 100 and on the diameter of each LDF 10 (i.e., on the third cross-sectional dimension $D_3$ of the LDF 10). As discussed above, the third cross-sectional dimension $D_3$ may vary from about 60 µm (e.g., for a glass core having a first cross-sectional dimension $D_1$ of about 35 µm to 40 µm) to 500 µm (e.g., for a glass core having a first cross-sectional dimension $D_1$ of about 450 µm). The amount of the LDF 10 that can be included in a given LDF bundle 100 can be calculated roughly as $N \approx D/a^2$, where N is the number of LDF 10, D is the area of the LED, and a is the diameter of the LDF 10. This relationship provides a rough approximation; the LDF 10 may be able to be packed within the LDF bundle 100 in a manner that allows for less dead space within the LDF bundle 100 so as to increase the number N of LDF 10 in the LDF bundle 100.

Figure 3:
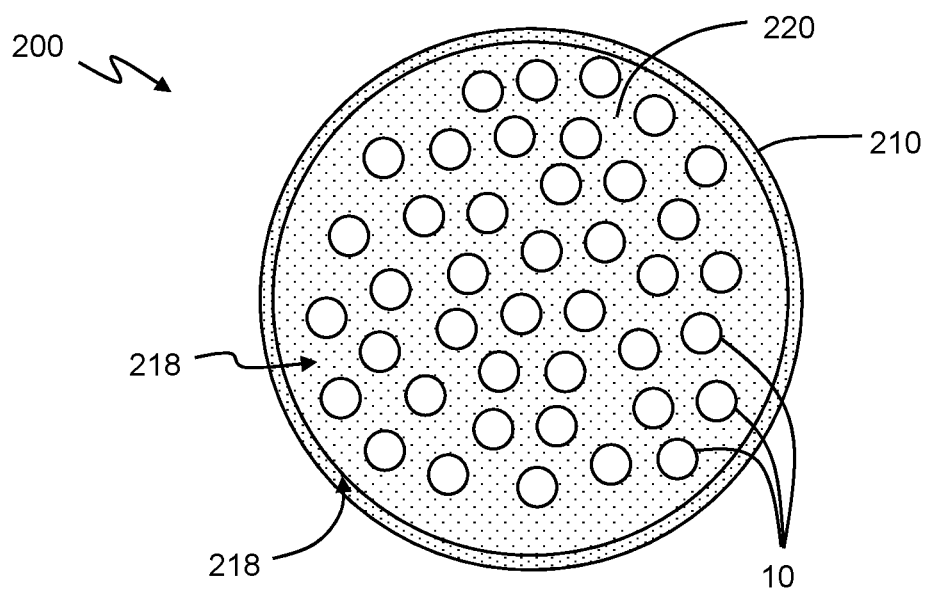
FIG. 3 is a cross-sectional view of a second exemplary embodiment of a light diffusing optical fiber bundle, according to an exemplary embodiment.

Referring to FIG. 3, another embodiment of a light-diffusing optical fiber bundle 200 is depicted. The LDF bundle 200 includes a jacket 210 that comprises scattering centers 218. The LDF bundle 200 further includes a plurality of LDF 10 arranged within the jacket 210. In embodiments where the jacket 210 includes scattering centers 218, the LDF 10 in the LDF bundle 200 do not contain scattering centers 218 in the cladding 14 or coating 16. Also disposed within the jacket 210 is filler 220. In the embodiment depicted in FIG. 3, the filler 220 also includes scattering centers 218. The scattering centers 218 may be the same or different as the scattering centers 18 provided in the individual LDF 10. As with the previous embodiment, incident light is directed into one of the ends of the LDF bundle 200 and thereby into one of the ends of each LDF 10 contained in the LDF bundle 200. Incident light travels within each LDF 10 and out through the core 12, the cladding 14, and the coating 16 as scattering UV light rays. As such, incident light rays continue out of each LDF 10, out through the filler 220 and jacket 210, and then exit the LDF bundle 200 as scattering rays.

In each of the embodiments of FIGS. 2 and 3, the jacket 110, 210 of the LDF bundle 100, 200 is made from a chlorinated or fluorinated polymer, such as polyvinylchloride, polytetrafluoroethylene, ethylene tertafluoroethylene, fluorinated ethylene propylene, etc. In other embodiments, the jacket 110, 210 of the LDF bundle 100, 200 includes at least one of ethylene-vinyl acetate (e.g., Apolhya®, available from Arkema S. A., Colombes, France), a copolyester-thermoplastic elastomer, a polyether block amine, a thermoplastic polyolefin, a thermoplastic polyurethane, a polyurethane, a polyamide, and polycarbonate, among others.

Figure 4:
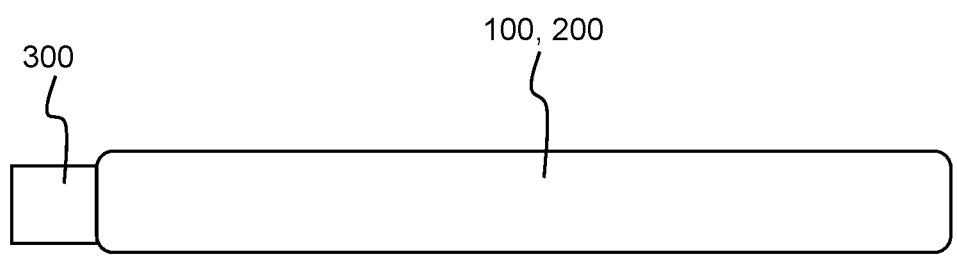
FIG. 4 is an optical fiber bundle connected to a UV LED, according to an exemplary embodiment.

FIG. 4 depicts an LDF bundle 100 or LDF bundle 200 connected to a UV LED light source 300. In embodiments, UV LED light source 300 may emit UV light at a wavelength of 360 nm to 420 nm. Certain commercially available UV LED have wavelengths of 405 nm, 395 nm, 385 nm, and 365 nm. Such UV LED have cross-sectional dimensions in the range of from 1 mm² to 5 mm². The LDF bundle 100, 200 is constructed to at least match the cross-sectional area of the UV LED.

In an exemplary embodiment using a UV LED 300 having a wavelength 405 nm and an LDF 10 having a glass composition that absorbs 15%/m of the UV light, the longest usable length (i.e., length at which losses are greater than 90%) is about 6 m. If the absorption loss is 50%/m, the longest usable LDF 10 is about 2 m. If the UV LED 300 emitted light at a wavelength less than 405 nm, then the length of the LDF 10 would be shorter still.

for certain are using medium efficiency UV fiber bundles may be described with following equation:

$$E = N*P*C0*EF/A$$

where E is desired radiation intensity (mW/cm²), N is the number of LDF 10 in the bundle, P is power of single light source UV LED, C0 is coupling efficiency from light source to diffusing fiber, EF is fiber diffusion efficiency at wavelength of the source, and A is area of the radiation in the system. For an area A of 10 cm×10 cm, a desired radiation intensity E equal to 10 mW/cm², a single LDF 10 in the LDF bundle 100, 200, a coupling efficient C0 of 0.8, and a diffusion efficiency EF of 100%, the power needed for a single UV LED light source 300 is 1.25 W. If efficiency EF drops to 50%, then the power P will double. Similarly, if the number N of LDF 10 in the LDF bundle 100, 200 doubled to two, then the power P needed would also double. To the extent multiple UV LED light sources 300 are needed to achieve a desired radiation intensity E, then the cost of the UV LED as compared to, e.g., UV laser diodes is much lower, decreasing the overall cost of the system. Further, to the extent the more LDF 10 are needed to match the size of the larger UV LED light source 300, then the low-silica glass composition is provides cost saving for the system as compared to typical fused silica LDF.

In embodiments, the LDF bundle 100, 200 and UV LED light source 300 is incorporated into a sterilization apparatus, in particular for medical instruments. The LDF bundle 100, 200 extends through a sterilization chamber in which an object or objects to be sterilized is/are placed. UV light is emitted from the LDF bundle 100, 200, and after exposure of the object(s) to the UV light over a period of about 10 minutes to about 2400 minutes, there will be at least a $\log_{10} 4$ reduction in bacterial pathogens.

Aspect (1) pertains to an ultraviolet (UV) illumination system comprising: at least one UV light emitting diode (LED); and a light-diffusing optical fiber bundle comprising: a bundle jacket; a plurality of optical fibers disposed within the bundle jacket, each optical fiber comprising: a glass core comprising a glass composition comprising less than 90 mol % silica; and a cladding surrounding the glass core; wherein at least one of the glass core or the cladding comprises scattering centers; and wherein the light-diffusing optical fiber bundle is optically coupled to the UV LED.

Aspect (2) pertains to the UV illumination system of Aspect (1), wherein the UV LED is configured to produce UV light having a wavelength of from 365 nm to 405 nm.

Aspect (3) pertains to the UV illumination system of Aspect (1) or Aspect (2), wherein the UV LED has an emission area of at least 1 mm² and wherein a facial area at an end of the light-diffusing optical fiber bundle is at least the same size as the emission area.

Aspect (4) pertains to the UV illumination system of any one of Aspects (1) through (3), wherein the glass composition of the glass core comprises at least one of a soda lime glass, a borosilicate glass, or an aluminosilicate glass.

Aspect (5) pertains to the UV illumination system of any one of Aspects (1) through (4), wherein the glass core comprises scattering centers.

Aspect (6) pertains to the UV illumination system of Aspect (5), wherein the scattering centers of the glass core comprise airlines.

Aspect (7) pertains to the UV illumination system of Aspect (5) or Aspect (6), wherein the scattering centers comprise at least one of $ZrO_2$, $Al_2O_3$, or glass phase seprations.

Aspect (8) pertains to the UV illumination system of any one of Aspects (5) through (7), wherein the concentration of the scattering centers in the glass core is from about 0.01% to about 5% by volume.

Aspect (9) pertains to the UV illumination system of any one of Aspects (1) through (8), wherein the cladding comprises a polymer.

Aspect (10) pertains to the UV illumination system of any one of Aspects (1) through (8), wherein the cladding comprises a second glass composition, the second glass composition being different from the glass composition of the glass core.

Aspect (11) pertains to the UV illumination system of Aspect (9) or Aspect (10), wherein the cladding includes scattering centers.

Aspect (12) pertains to the UV illumination system of Aspect (11) wherein the scattering centers of the cladding comprise high index particles in which the refractive index of the high index particles is at least 0.05 higher than the refractive index of the cladding.

Aspect (13) pertains to the UV illumination system of Aspect (12), wherein the high index particles comprise at least one of BaS, $SiO_2$, $Al_2O_3$, or $ZrO_2$.

Aspect (14) pertains to the UV illumination system of Aspect (11), wherein the scattering centers comprise voids.

Aspect (15) pertains to the UV illumination system of any one of Aspects (11) through (14), wherein the concentration of the scattering centers in the cladding is from 0.05% to 2% by volume.

Aspect (16) pertains to the UV illumination system of any one of Aspects (1) through (15), wherein the bundle jacket comprises a polymer.

Aspect (17) pertains to the UV illumination system of Aspect (16), wherein the polymer comprises at least one of polyvinylchloride, polytetrafluoroethylene, ethylene tertafluoroethylene, fluorinated ethylene propylene, ethylene-vinyl acetate, a copolyester-thermoplastic elastomer, a polyether block amine, a thermoplastic polyolefin, a thermoplastic polyurethane, a polyurethane, a polyamide, or polycarbonate.

Aspect (18) pertains to the UV illumination system of any one of Aspects (1) through (17), wherein the bundle jacket comprises scattering centers.

Aspect (19) pertains to the UV illumination system of Aspect (18), wherein the scattering centers of the bundle jacket comprise at least one of $Al_2O_3$, BaS, hollow glass spheres, or gas bubbles.

Aspect (20) pertains to the UV illumination system of any one of Aspects (1) through (19), wherein the optical fiber bundle further comprises a filler disposed within the bundle jacket and around the plurality of optical fibers.

Aspect (21) pertains to the UV illumination system of any one of Aspects (1) through (20), wherein the plurality of optical fibers comprises at least 10 optical fibers.

Aspect (22) pertains to an ultraviolet (UV) light-diffusing fiber (LDF) comprising: a glass core comprising a glass composition comprising less than 90 mol % of $SiO_2$; and a cladding disposed longitudinally around the glass core; wherein at least one of the glass core or the cladding comprises scattering centers; and wherein the glass composition absorbs at least 10% of light having a wavelength less than 400 nm per meter.

Aspect (23) pertains to the UV LDF of Aspect (22), wherein the glass composition comprises at least 50 mol % $SiO_2$, up to 20 mol % of $Al_2O_3$, up to 20 mol % $B_2O_3$, and up to 25 mol % of at least one of $R_2O$ or RO, wherein R is any one or more of Li, Na, K, Rb, or Cs in $R_2O$ and wherein R is any one or more of Zn, Mg, Ca, Sr, or Ba in RO.

Aspect (24) pertains to the UV LDF of Aspect (22) or Aspect (23), wherein the glass composition comprises at most 1 ppm each of Co, Ni, and Cr and at most 50 ppm of Fe.

Aspect (25) pertains to the UV LDF of anyone of Aspects (22) through (24), wherein the glass core comprises scattering centers.

Aspect (26) pertains to the UV LDF of Aspect (25), wherein the scattering centers of the glass core comprise airlines.

Aspect (27) pertains to the UV LDF of Aspect (25), wherein the scattering centers of the glass core comprise at least one of $ZrO_2$, $Al_2O_3$, or glass phase separations.

Aspect (28) pertains to the UV LDF of anyone of Aspects (25) through (27), wherein the concentration of the scattering centers in the glass core is from about 0.01% to about 5% by volume.

Aspect (29) pertains to the UV LDF of anyone of Aspects (22) through (28), wherein the cladding comprises a polymer.

Aspect (30) pertains to the UV LDF of anyone of Aspects (22) through (28), wherein the cladding comprises a second glass composition, the second glass composition being different from the glass composition of the glass core.

Aspect (31) pertains to the UV LDF of anyone of Aspects (22) through (30), wherein the cladding includes scattering centers.

Aspect (32) pertains to the UV LDF of Aspect (31), wherein the scattering centers comprise high index particles in which the refractive index of the high index particles is at least 0.05 higher than the refractive index of the cladding.

Aspect (33) pertains to the UV LDF of Aspect (32), wherein the high index particles comprise at least one of BaS, $SiO_2$, $Al_2O_3$, or $ZrO_2$.

Aspect (34) pertains to the UV LDF of Aspect (31), wherein the scattering centers of the cladding comprise voids.

Aspect (35) pertains to the UV LDF of any one of Aspects (31) through (34), wherein the concentration of the scattering centers in the cladding is from about 0.05% to about 2% by volume.

Aspect (36) pertains to the UV LDF of any one of Aspects (22) through (35), further comprising a coating disposed around the cladding.

Aspect (37) pertains to an optical fiber bundle, comprising: a bundle jacket; a plurality of UV LDF according to any of Aspects (22) through (36) disposed within the bundle jacket.

Aspect (38) pertains to the optical fiber bundle of Aspect (37), wherein the bundle jacket comprises a polymer.

Aspect (39) pertains to the optical fiber bundle of Aspect (38), wherein the polymer comprises at least one of polyvinylchloride, polytetrafluoroethylene, ethylene tertafluoroethylene, fluorinated ethylene propylene, ethylene-vinyl acetate, a copolyester-thermoplastic elastomer, a polyether block amine, a thermoplastic polyolefin, a thermoplastic polyurethane, a polyurethane, a polyamide, or polycarbonate.

Aspect (40) pertains to the optical fiber bundle of any one of Aspects (37) through (39), wherein the bundle jacket comprises scattering centers.

Aspect (41) pertains to the optical fiber bundle of Aspect (40), wherein the scattering centers of the bundle jacket comprise at least one of $Al_2O_3$, BaS, hollow glass spheres, or gas bubbles.

Aspect (42) pertains to the optical fiber bundle of any one of Aspects (37) through (41), further comprising a filler disposed within the bundle jacket and around the plurality of optical fibers.

Aspect (43) pertains to the optical fiber bundle of any one of Aspects (37) through (42), wherein the plurality of optical fibers comprises at least 10 optical fibers.

Aspect (44) pertains to a method for sterilizing an object using ultraviolet (UV) light, the method comprising the steps of: causing UV light to emit from at least one UV light emitting diode (LED) into an optical fiber bundle that is coupled to the UV LED, the optical fiber bundle comprising a plurality of optical fibers disposed within a jacket, each of the plurality of optical fibers having a glass core comprising less than 90 mol % silica; scattering the UV light from the optical fiber bundle; and exposing the object to the UV light scattered from the optical fiber bundle.

Aspect (45) pertains to the method Aspect (43), wherein the UV light has a wavelength of from 365 nm to 405 nm.

Aspect (46) pertains to the method of Aspect (43) or Aspect (44), wherein the step of exposing the object to the UV light is performed a for a dose of about 40 $J/cm^2$ to about 600 $J/cm^2$.

Aspect (47) pertains to the method of any one of Aspects (43) through (45), wherein after the step of exposing, the object experiences a $\log_{10} 4$ reduction in bacterial pathogens or higher.

Aspect (48) pertains to the optical fiber bundle of any one of Aspects (43) through (46), wherein the step of scattering provides at least 10 mW/cm² over an area of 100 cm².

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An ultraviolet (UV) illumination system comprising:
   at least one UV light emitting diode (LED); and
   a light-diffusing optical fiber bundle comprising:
      a bundle jacket;
      a plurality of optical fibers disposed within the bundle jacket, each optical fiber comprising:
         a glass core comprising a glass composition comprising less than 90 mol % silica; and
         a cladding surrounding the glass core;
         wherein at least one of the glass core or the cladding comprises scattering centers;
      wherein the light-diffusing optical fiber bundle is optically coupled to the UV LED.

2. The UV illumination system of claim 1, wherein the UV LED is configured to produce UV light having a wavelength of between 365 nm and 405 nm.

3. The UV illumination system of claim 1, wherein the UV LED has an emission area of at least 1 mm² and wherein a facial area at an end of the light-diffusing optical fiber bundle is at least the same size as the emission area.

4. The UV illumination system of claim 1 wherein the glass composition of the glass core comprises at least one of a soda lime glass, a borosilicate glass, or an aluminosilicate glass.

5. The UV illumination system of claim 1, wherein the glass core comprises scattering centers.

6. The UV illumination system of claim 5, wherein the scattering centers of the glass core comprise airlines.

7. The UV illumination system of claim 5, wherein the scattering centers comprise at least one of $ZrO_2$, $Al_2O_3$, or glass phase seprations.

8. The UV illumination system of claim 5, wherein the concentration of the scattering centers in the glass core is from about 0.01% to about 5% by volume.

9. The UV illumination system of claim 1, wherein the cladding comprises a polymer.

10. The UV illumination system of claim 1, wherein the cladding comprises a second glass composition, the second glass composition being different from the glass composition of the glass core.

11. The UV illumination system of claim 9, wherein the cladding includes scattering centers.

12. The UV illumination system of claims 11, wherein the scattering centers of the cladding comprise high index particles in which the refractive index of the high index particles is at least 0.05 higher than the refractive index of the cladding.

13. The UV illumination system of claim 12, wherein the high index particles comprise at least one of BaS, $SiO_2$, $Al_2O_3$, or $ZrO_2$.

14. The UV illumination system of claim 11, wherein the scattering centers comprise voids.

15. The UV illumination system of claim 11, wherein the concentration of the scattering centers in the cladding is from 0.05% to 2% by volume.

16. The UV illumination system of claim 1, wherein the bundle jacket comprises a polymer.

17. The UV illumination system of claim 16, wherein the polymer comprises at least one of polyvinylchloride, polytetrafluoroethylene, ethylene tertafluoroethylene, fluorinated ethylene propylene, ethylene-vinyl acetate, a copolyester-thermoplastic elastomer, a polyether block amine, a thermoplastic polyolefin, a thermoplastic polyurethane, a polyurethane, a polyamide, or polycarbonate.

18. The UV illumination system of claim 1, wherein the bundle jacket comprises scattering centers.

19. The UV illumination system of claim 18, wherein the scattering centers of the bundle jacket comprise at least one of $Al_2O_3$, BaS, hollow glass spheres, or gas bubbles.

20. The UV illumination system of claim 1, wherein the optical fiber bundle further comprises a filler disposed within the bundle jacket and around the plurality of optical fibers.

21. The UV illumination system of claim 1, wherein the plurality of optical fibers comprises at least 10 optical fibers.

22. An aultraviolet (UV) light-diffusing fiber (LDF) comprising:
   a glass core comprising a glass composition comprising less than 90 mol % of $SiO_2$; and
   a cladding disposed longitudinally around the glass core, the cladding having a lower refractive index than the glass core;
   wherein the cladding comprises scattering centers, and the scattering centers in the cladding comprise high index particles in which the refractive index of the high index particles is at least 0.05 higher than the refractive index of vthe cladding and
   wherein the glass composition absorbs at least 10% of light having a wavelength less than 400 nm per meter.

23. The UV LDF of claim 22, wherein the glass composition comprises at least 50 mol % $SiO_2$, up to 20 mol % of $Al_2O_3$, up to 20 mol % $B_2O_3$, and up to 25 mol % of at least one of $R_2O$ or RO, wherein R is any one or more of Li, Na, K, Rb, or Cs in $R_2O$ and wherein R is any one or more of Zn, Mg, Ca, Sr, or Ba in RO.

24. The UV LDF of claim 22, wherein the glass composition comprises at most 1 ppm each of Co, Ni, and Cr and at most 50 ppm of Fe.

25. An aultraviolet (UV) light-diffusing fiber (LDF) comprising:
   a glass core comprising a glass composition comprising less than 90 mol % of $SiO_2$; and a cladding disposed longitudinally around the glass core, the cladding having a lower refractive index than the glass core;

werein the glass composition absorbs at least 10% of light having a wavelength less than 400 nm per meter; and wherein the glass core comprises scattering centers and wherein: (i) wherein the scattering centers of the glass core comprise airlines and/or (ii) the scattering centers of the glass core comprise at least one of $ZrO_2$, $Al_2O_3$, or glass phase separations.

26. The UV LDF of claim 25, wherein the concentration of the scattering centers in the glass core is from about 0.01% to about 5% by volume.

27. The UV LDF of claim 25, wherein the wherein the cladding comprises a second glass composition, the second glass composition being different from the glass composition of the glass core.

28. The UV LDF of claim 22, wherein the concentration of the scattering centers in the glass core is from about 0.01% to about 5% by volume.

29. The UV LDF of claim 22, wherein the cladding comprises a polymer.

30. The UV LDF of claim 22, wherein the cladding comprises a second glass composition, the second glass composition being different from the glass composition of the glass core.

31. The UV LDF of claim 25, wherein the cladding includes scattering centers.

32. The UV LDF of claim 31, wherein the scattering centers comprise high index particles in which the refractive index of the high index particles is at least 0.05 higher than the refractive index of the cladding.

33. The UV LDF of claim 32, wherein the high index particles comprise at least one of BaS, $SiO_2$, $Al_2O_3$, or $ZrO_2$.

34. The UV LDF of claim 31, wherein the scattering centers of the cladding comprise voids.

35. The UV LDF of claim 31, wherein the concentration of the scattering centers in the cladding is from about 0.05% to about 2% by volume.

36. The UV LDF of claim 22, further comprising a coating disposed around the cladding.

37. An optical fiber bundle, comprising:
a bundle jacket;
a plurality of UV LDF according to claim 22 disposed within the bundle jacket.

38. The optical fiber bundle of claim 37, wherein the bundle jacket comprises a polymer.

39. The optical fiber bundle of claim 38, wherein the polymer comprises at least one of polyvinylchloride, polytetrafluoroethylene, ethylene tertafluoroethylene, fluorinated ethylene propylene, ethylene-vinyl acetate, a copolyester-thermoplastic elastomer, a polyether block amine, a thermoplastic polyolefin, a thermoplastic polyurethane, a polyurethane, a polyamide, or polycarbonate.

40. The optical fiber bundle of claim 37, wherein the bundle jacket comprises scattering centers.

41. The optical fiber bundle of claim 40, wherein the scattering centers of the bundle jacket comprise at least one of $Al_2O_3$, BaS, hollow glass spheres, or gas bubbles.

42. The optical fiber bundle of claim 37, further comprising a filler disposed within the bundle jacket and around the plurality of optical fibers.

43. The optical fiber bundle of claim 37 wherein the plurality of optical fibers comprises at least 10 optical fibers.

44. A method for sterilizing an object using ultraviolet (UV) light, the method comprising the steps of:
causing UV light to emit from at least one UV light emitting diode (LED) into an optical fiber bundle that is coupled to the UV LED, the optical fiber bundle comprising a plurality of optical fibers disposed within a jacket, each of the plurality of optical fibers having a glass core comprising less than 90 mol % silica;
scattering the UV light from the optical fiber bundle; and
exposing the object to the UV light scattered from the optical fiber bundle.

45. The method of claim 43, wherein the UV light has a wavelength of from 365 nm to 405 nm.

46. The method of claim 43, wherein the step of exposing the object to the UV light is performed a for a dose of about 40 J/cm² to about 600 J/cm².

47. The method of claim 43, wherein after the step of exposing, the object experiences a $\log_{10}4$ reduction in bacterial pathogens or higher.

48. The method of claim 43, wherein the step of scattering provides at least 10 mW/cm² over an area of 100 cm².

* * * * *